Patented Aug. 26, 1952

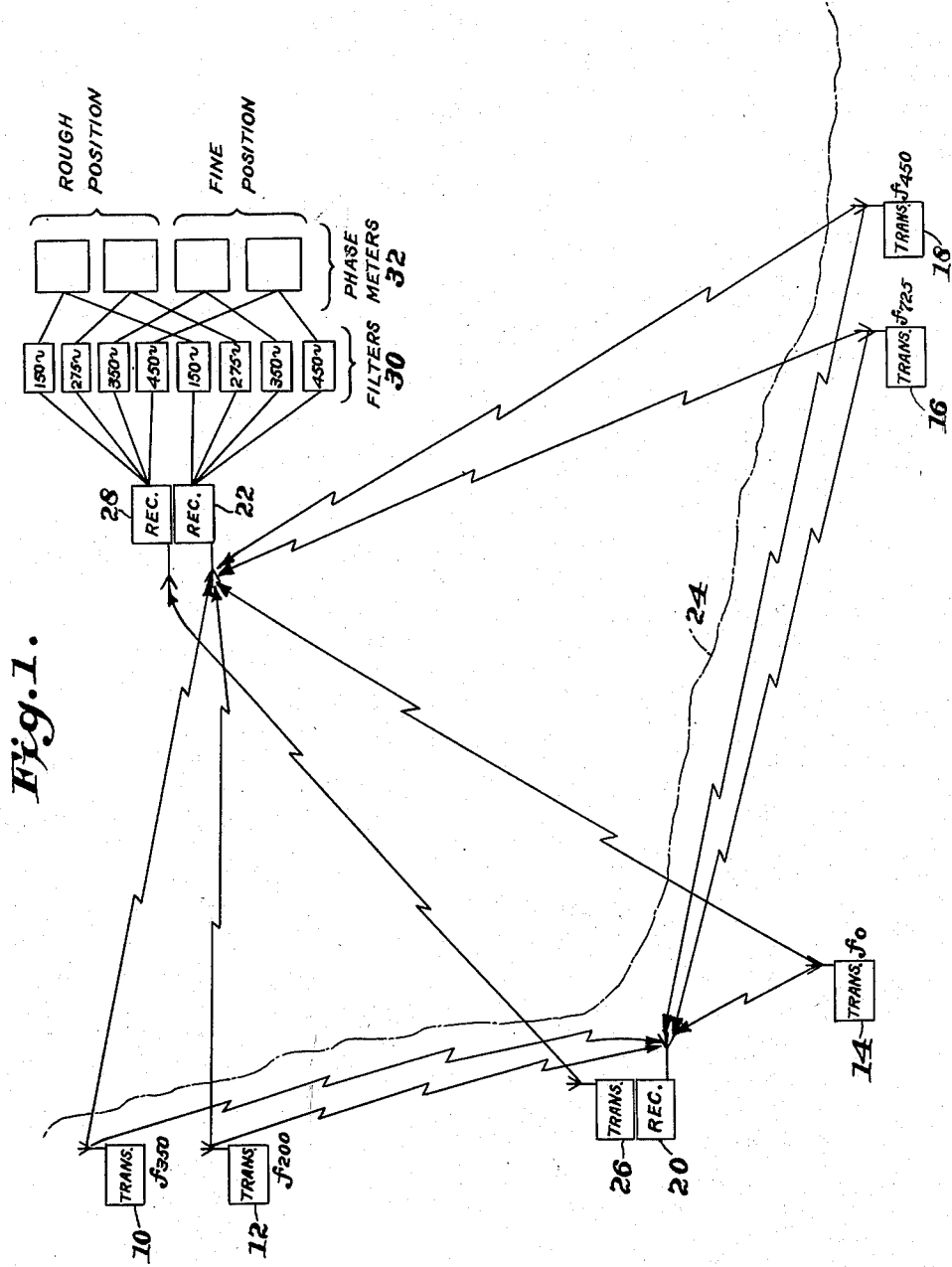

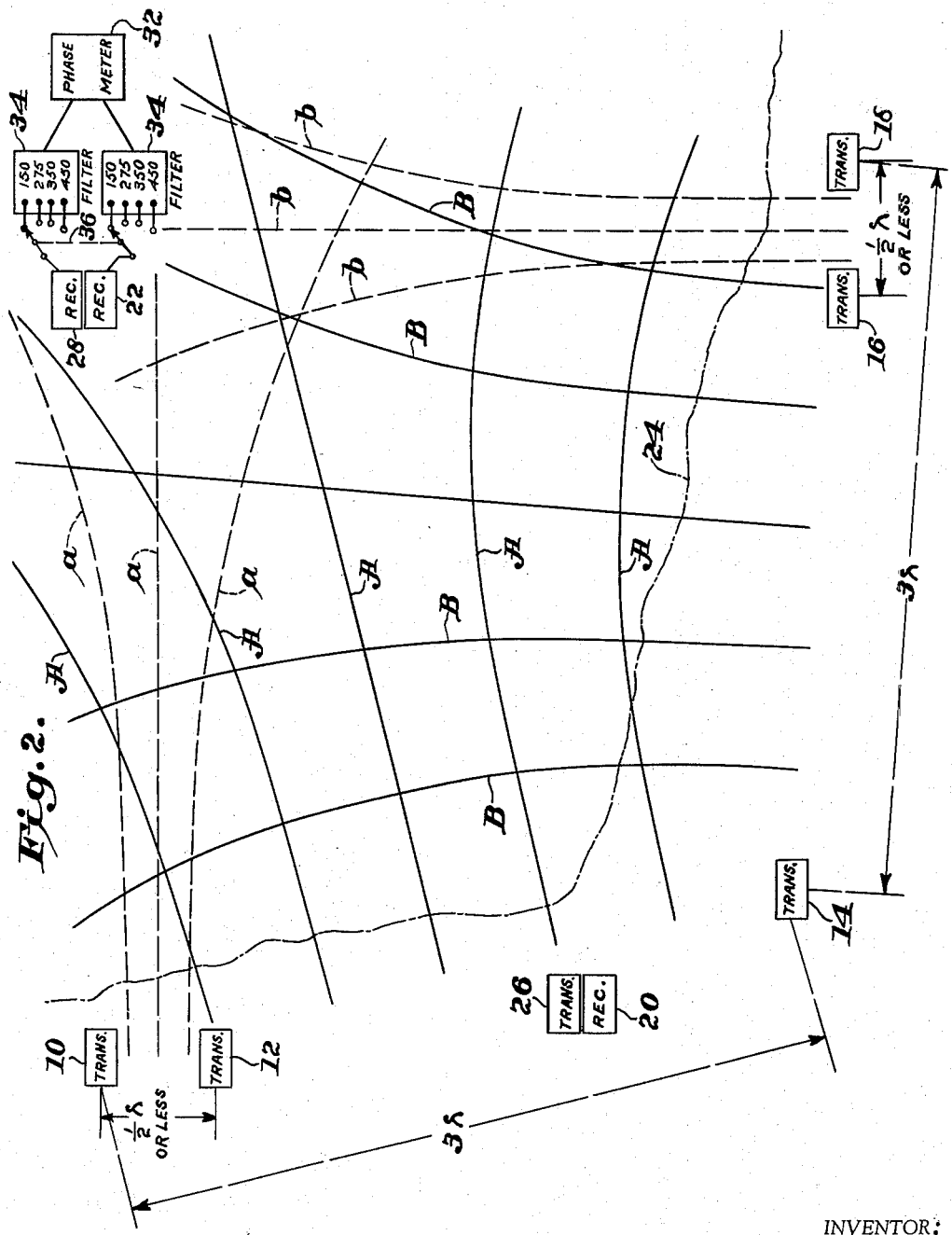

2,608,686

UNITED STATES PATENT OFFICE 2,608,686

RADIO NAVIGATION SYSTEM

Charles E. Hastings, Hampton, Va., assignor to Hastings Instrument Company, Inc., Hampton, Va., a corporation of Virginia Application October 11, 1950, Serial No. 189,633

10 Claims. (Cl. 343—105)

This invention relates to a navigation system and method operable on the principle of phase comparison of beat frequencies between the signals of pairs of transmitters, as detected at spaced points.

It is an object of the present invention to provide a navigation system and method capable of determining position with an extremely high degree of accuracy, and without ambiguity.

It is a further object of the invention to provide a navigation system and method capable of determining position substantially instantaneously, without regard to previous knowledge of position or tracking.

A further object is to provide a navigation system and method employing standard radio communication units.

Another object of the invention is to provide an unsaturable navigation system and method, which may be used simultaneously by any number of mobile objects to determine their position.

Further objects will be in part obvious and in part pointed out hereinafter in this specification and the appended claims.

The invention and the novel features thereof may best be made clear from the following description and the accompanying drawings, in which:

Figure 1 is a block diagram illustrating an exemplary embodiment of the invention, showing the basic elements thereof, and Figure 2 is a diagram corresponding generally to Figure 1, illustrating one mode of operation of the system.

Referring to the drawings, in Figure 1 is shown an exemplary embodiment of the invention, including a group of fixed transmitters 10, 12 and 14, the term "fixed" being employed to connote known position. The transmitters may operate on any assigned frequency, a frequency assignment, for example, between .02 and 20 megacycles with a bandwidth of 1,000 cycles being entirely satisfactory. The transmitters are adapted to transmit at different frequencies, preferably at frequencies differing by audio notes, and by way of example transmitter 14 may transmit at a reference frequency $f_0$, transmitter 12 at a frequency 200 cycles greater, or $f_{200}$, and transmitter 10 at a frequency 350 cycles greater, or $f_{350}$.

In conjuction with the first group of transmitters, a second group is employed, including transmitters 14, 16 and 18. While transmitter 14 is conveniently employed as one of the transmitters of each group, it will be recognized that this is not essential. The two groups of transmitters are differently positioned relative to each other, and preferably angularly positioned relative to each other, as shown. As in the case of the first group, the transmitters of the second group are adapted to transmit at different frequencies. Transmitter 16, for example, may transmit at a frequency 725 cycles above that of transmitter 14, or $f_{725}$, and transmitter 20 may transmit at a frequency 450 cycles above the frequency of transmitter 14, or $f_{450}$.

Further essential elements of the invention include a stationary receiver 20, and a mobile receiver 22, which latter unit may be carried on a ship, aircraft or other mobile object. The mobile receiver, it will be understod, is merely a receiver of unknown position, and need not necessarily be moving, nor even movable. If the system is to be employed over water, the transmitters and the fixed receiver may conveniently be arranged along a shore line 24, as shown. Receiver 20 may be located at any convenient position where it may remain stationary with respect to the previously mentioned transmitters.

The receivers 20 and 22 are adapted to receive the transmissions of the various transmitters and detect the beat frequencies therebetween, and the receivers will obviously detect the same beat frequencies wherever located. However, it will be recognized that the phase of the detected beat frequency signals will vary with the position of the receiver. By measuring the phase difference between like beat frequency signals detected by two spaced-apart receivers, that is, by measuring the difference in phase between the beat frequency of the transmissions of the same transmitter pair as detected at different positions, a hyperbolic line of position of the mobile receiver relative to that transmitter pair may be determined. The greater the spacing between the transmitters, the greater will be the accuracy with which the line of position may be determined.

To accomplish this end, beat frequency signals detected by the spaced receivers may be relayed to a common point, and there amplified and fed to a conventional phase meter adapted to indicate the phase difference therebetween. One receiver being fixed, the phase difference so determined will vary with difference in distance between the mobile receiver on the one hand, and each of the transmitters on the other. So long as the difference in distance between the mobile receiver and the two transmitters remains the same, the phase difference between the detected signals will not vary. Accordingly, it follows that if the mobile receiver moves along a hyperbolic path having the transmitters as focal points, no change in phase difference will be effected, while if the mobile receiver moves laterally relative to such a path, a corresponding change in phase difference will take place.

Accordingly, the phase difference indicated by the phase meter will be indicative of the position of the mobile receiver with respect to a family of hyperbolas having the transmitters as focal points. Using conventional transmission frequencies and a spacing between transmitters consonant with great accuracy, the distance between transmitters will be great relative to the wave length of transmission, and the family of hyperbolas will constitute a plurality of sectors or lanes, each defined by hyperbolic lines spaced one-half wave length apart where they intersect a straight base line drawn between the transmitters. Traverse of a lane so defined by the mobile receiver will change the differential distance between the receiver and the transmitters one wave length, thereby effecting a 360° change in phase difference as indicated by a phase meter. It follows that if the zero position of the phase meter is adjusted to correspond to position of the mobile receiver on one of the lane-defining lines, the phase meter reading will directly indicate a line of position within a lane, although it will not identify the lane wherein the receiver lies.

If two transmitters are located at stations spaced apart a distance not exceeding one-half the wave length of transmission thereof, the problem of lane identification does not arise, since the entire possible range of movement of the mobile receiver results in a change in phase difference not exceeding one cycle, or not exceeding 360° as recorded by the phase meter. In this case, then, the phase meter reading indicates a hyperbolic line of position relative to the receivers which may be readily and directly established. The line of position so established is insufficiently accurate to indicate position with precision, but it is an outstanding feature of the present invention to employ two transmitters so spaced to determine the rough position of the mobile receiver, and obviate thereby the problem of lane identification.

Referring to Figure 2, assuming a position of mobile receiver 22 as shown, if the transmitter pairs 10—12 and 16—18 are spaced apart a distance not exceeding half the wave length of the emissions thereof, it will be readily understood that lines of position of the mobile receiver 22 may be readily established with respect to the transmitter pairs 10—12 and 16—18. That is, the phase difference between the beat frequency of the transmitter pair 10—12 as detected by receivers 20 and 22 will be indicative of the position of receiver 22 with respect to a family of hyperbolic lines illustrated in the drawings as dotted lines a, these lines having receivers 10 and 12 as focal points. Similarly, the phase difference between the beat frequency of transmitters 16 and 18 as detected by receivers 20 and 22 will indicate the position of receiver 22 relative to a similar family of hyperbolic lines illustrated as dotted lines b, these lines having transmitters 16 and 18 as focal points. The transmitters being fixed in position, the families of hyperbolic lines may be previously established and identified with phase meter readings, and employed as an overlay with a map of the area, whereby the phase meter readings may be easily converted into lines of position, or the data derived from the phase meter may be reduced to latitude and longitude by the use of computers, or by actual construction. In this manner, the phase meter readings indicating difference in phase between the audio beats of the transmitter pairs 10—12 and 16—18 as received at the receivers may be utilized to identify two rough lines of position, whose intersection represents the rough position of the mobile transmitter.

Employing next the transmitter pairs 10—14 and 14—18, and determining the phase difference between the audio beats thereof as detected by the receivers, a fine position of the mobile transmitter may be determined with much greater accuracy. In the example shown, transmitters 10 and 14 are spaced apart three wave lengths, whereby six lanes of position are established therebetween, the lanes being separated by imaginary hyperbolic lines A, having transmitters 10 and 14 as focal points and separated one-half wave length where they intersect the base line extending between the transmitters. Accordingly, movement of the mobile receiver from one line A to the next on either side will effect a change of 360° in the phase difference between the beat frequencies of the transmissions of the transmitter pair 10—14 as detected by the receivers, and will effect a corresponding complete revolution of the phase meter. If the phase meter be zeroed to correspond to the lines of lane demarcation, the meter will indicate directly hyperbolic lines of position intermediate the lines of lane demarcation with great accuracy. Similarly, transmitters 14 and 18 are spaced apart three wave lengths, establishing six lanes of position therebetween, separated by imaginary hyperbolic lines B.

As in the previous case, a plot may be previously established indicating the lines of lane demarcation relative to the transmitters and a plurality of intermediate lines of position in each lane corresponding to phase meter readings. Employing this plot as an overlay, the rough position of the receiver as established by transmitter pairs 10—12 and 16—18 will immediately identify the lane in which the receiver is positioned. The lane being thus identified, the phase difference between the beat signals detected by receivers 20 and 22 may be utilized with the plot to establish the line of position of the receiver with great accuracy. Similarly, employing transmitters 14 and 18, another line of position of receiver 22 relative to these transmitters may be determined with corresponding accuracy, the problem of lane identification being again obviated by the rough position of the receiver previously determined. The intersection of the lines of position derived from the beat frequencies of transmitter pairs 10—14 and 14—18, then, will accurately establish the fine position of the mobile receiver.

Since the transmitters are employed in pairs, it will be apparent that the transmitters of each group need not be arranged in line nor according to any particular configuration, nor need the groups be disposed at a right angle or any other angle relative to each other, it being necessary only that the pair being used together to establish a line of position be spaced from each other.

I have also discovered that the one-half wave length spacing of the rough position transmitters 10,12 and 16,18 may be exceeded where the possible navigating area lies within a 360° phase shift of the rough indicator instruments. That is, in a harbor installation, for example, the only requirement is that the rough position transmitters be so oriented that the hyperbolic lines representing 0° and 360° are wide enough to circumscribe the entire water area.

The position determination as outlined above may be made within a very short time, of the order of a few seconds or less. In the system of Figure 1, for example, the signals detected by receiver 20 may be relayed by a reference transmitter 26 to a receiver 28, also located on the mobile object. It will be evident that in other applications, the beat frequencies detected by the fixed receiver may be relayed to a common position by other means, such as telephone lines or cables. At the mobile object, the beat frequencies may be amplified, desirably by matched amplifiers of a constant output type, and the output of the amplifiers fed to a plurality of filters 30. As shown in the figure, the signals detected by each receiver at the mobile position are fed to four different filters, adapted, in the assumed example, to pass beat frequencies of 150, 275, 350 and 450 cycles, respectively. The filter pairs are desirably matched, the 150 cycle filters being matched to each other and so forth. So separated, the like beat frequencies passed by the filter pairs are supplied to conventional phase meters 32. It will be apparent that the 150 cycle beat frequencies passed by one filter pair will effect a reading on the phase meter to which these signals are fed indicating a rough line of position of the mobile object relative to the transmitter pair 10—12. Similary, the 275 cycle signals fed to another phase meter 32 will indicate the rough line of position of the mobile object with respect to the transmitter pair 16—18. The 350 cycle signals fed to a third phase meter will indicate the fine line of position of the mobile object with respect to transmitter pair 10—14 and the 450 cycle signals will indicate a fine line of position of the mobile object relative to transmitter pair 14—18. In this manner, on a proper plot of the area previously established relative to the fixed position of the transmitters, or by computer or other means, the phase meter indications will establish both rough and fine position of the mobile object. The rough position readings will immediately establish the lane position of the mobile receiver relative to transmitter pairs 10—14 and 14—18, and the readings of the fine position phase meters will indicate lines of position within those lanes by which the position of the receiver may be established with great accuracy.

The system described will operate consistently with accuracies of one part in 5,000 or one foot, whichever is greater, at ranges of up to a hundred and fifty miles during daylight hours and seventy-five miles at night. Under excellent propagation conditions, daytime operation may be satisfactory at ranges in excess of five hundred miles. If accuracy of the highest order is required, further transmitter pairs may be employed, spaced apart greater distances than the receiver pairs 10—14 and 14—18, with additional filters and phase meters on the mobile object. Obviously, the greater the spacing between transmitters the higher the accuracy, and since lane ambiguity is obviated by the present invention, the greatest accuracy is possible.

In order to reduce the mobile equipment to a minimum, conventional frequency selective filters 34 may be employed on the mobile object, together with switching means 36, as illustrated in Figure 2. In this case, only a single phase meter 32 is required. While employing less equipment, this variation requires slightly more time to indicate position, since the four or more required phase meter readings must be obtained successively, rather than simultaneously, and if the mobile object is moving rapidly accuracy will be somewhat reduced.

While the foregoing relates to a two dimensional navigation system and method, it will be apparent that the system may be extended to three dimensions by arranging transmitter pairs vertically or angularly relative to the ground. The system is extremely flexible, and may readily be expanded into a continuous chain. An additional station may be established merely by a single additional CW transmitter. The transmitters may be hermetically sealed and equipped with small whip antennas, and readily attached to existing power line or telegraph poles. The resulting flexibility of transmitter location makes it possible to establish lines of position having good intersections in any area in a chain of stations. Some care must be exercised in selecting transmitter frequencies, to avoid undesirable harmonics and sub-harmonics. The exemplary frequencies listed above are entirely suitable, and further frequencies for additional stations may be readily determined.

It will be recognized that the system requires but a single primary frequency, and one additional frequency for the reference transmitter. Effects of frequency drift inherently cancel out. The system may operate continuously, no synchronizing methods being required, and may be used simultaneously by an unlimited number of mobile objects, each receiving its own position data.

It will thus be seen that there has been provided by this invention a system and method in which the various objects hereinbefore set forth, together with many practical advantages, are successfully achieved. As various possible embodiments may be made of the several features of the above invention, all without departing from the scope thereof, it is to be understood that all matter hereinbefore set forth or shown in the accompanying drawings is to be interpreted as illustrative, and not in a limiting sense.

I claim:

1. Apparatus of the class described comprising a plurality of transmitters adapted to transmit at different frequencies, one pair of said transmitters being spaced apart a distance not exceeding one-half the wave length of the emissions thereof and another pair being spaced apart a greater distance, two spaced receivers each adapted to detect the beat frequencies between the emissions of said transmitter pairs, and means for indicating the difference in phase between the beat frequencies detected by said receivers.

2. Apparatus of the class described comprising a plurality of transmitters adapted to transmit at different frequencies, one pair of said transmitters being spaced apart a distance not exceeding one-half the wave length of the emissions thereof and another pair being spaced apart a greater distance, a mobile receiver and a fixed receiver each adapted to detect the beat frequencies between the emissions of said transmitter pairs, and means associated with said mobile receiver for indicating the difference in phase between the beat frequencies detected by said receivers.

3. Apparatus of the class described comprising a plurality of fixed transmitters adapted to transmit at frequencies differing by audio notes, one pair of said transmitters being spaced apart a distance not exceeding one-half the wave length of the emissions thereof and another pair being spaced apart a greater distance, a mobile receiver and a fixed receiver each adapted to detect the beat frequencies between the emissions of said transmitter pairs, and means associated with said mobile receiver for indicating the difference in phase between the beat frequencies detected by said receivers.

4. Apparatus of the class described comprising a plurality of fixed transmitters adapted to transmit at frequencies differing by audio notes, one pair of said transmitters being spaced apart a distance not exceeding one-half the wave length of the emissions thereof and another pair being spaced apart a greater distance, a mobile receiver and a fixed receiver each adapted to detect the beat frequencies between the emissions of said transmitter pairs, means for relaying the beat frequencies detected by said fixed receiver to the position of said mobile receiver, and means associated with said mobile receiver for indicating the difference in phase between like beat frequencies detected by said receivers.

5. Apparatus of the class described comprising three fixed transmitters adapted to transmit at frequencies differing by audio notes, the second of said transmitters being spaced from the first a distance not exceeding one-half the wave length of the emissions thereof and the third of said transmitters being spaced from the first a greater distance, a mobile receiver and a fixed receiver each adapted to detect the beat frequencies between the emissions of said transmitters, and means for relaying the beat frequencies detected by said fixed receiver to the position of said mobile receiver.

6. Apparatus of the class described comprising a first group of transmitters and a second group of transmitters, said transmitters being adapted to transmit at different frequencies, one pair of transmitters of each group being spaced apart a distance not exceeding one-half the wave length of the emissions thereof and another pair of transmitters of each group being spaced apart a greater distance, two spaced receivers each adapted to detect the beat frequencies between the emissions of said transmitters, and means for indicating the difference in phase between like beat frequencies as detected by said receivers.

7. Apparatus of the class described comprising a first group of fixed transmitters and a second group of fixed transmitters, said transmitters being adapted to transmit at different frequencies, one pair of transmitters of each group being spaced apart a distance not exceeding one-half the wave length of the emissions thereof and another pair of transmitters of each group being spaced apart a greater distance, a mobile receiver and a fixed receiver each adapted to detect the beat frequencies between the emissions of said transmitters, and means for indicating the difference in phase between like beat frequencies as detected by said receivers.

8. Apparatus of the class described comprising a first group of fixed transmitters and a second group of fixed transmitters, said transmitters being adapted to transmit at frequencies differing by audio notes, said groups of transmitters being differently positioned relative to each other, one pair of transmitters of each group being spaced apart a distance not exceeding one-half the wave length of the emissions thereof and another pair of transmitters of each group being spaced apart a greater distance, a mobile receiver and a fixed receiver each adapted to detect the beat frequencies between the emissions of said transmitters, means for relaying the beat frequencies detected by said fixed receiver to the position of said mobile receiver, and means associated with said mobile receiver for indicating the difference in phase between like beat frequencies as detected by said receivers.

9. Apparatus of the class described comprising a first group of fixed transmitters and a second group of fixed transmitters, said transmitters being adapted to transmit at frequencies differing by audio notes, said groups of transmitters being differently positioned relative to each other, one pair of transmitters of each group being spaced apart a distance not exceeding one-half the wave length of the emissions thereof and another pair of transmitters of each group being spaced apart a greater distance, a mobile receiver and a fixed receiver each adapted to detect the beat frequencies between the emissions of said transmitters, means for relaying the beat frequencies detected by said fixed receiver to the position of said mobile receiver, filter means associated with said mobile receiver adapted to pass like beat frequencies as detected by said receivers, and means associated with said filter means for indicating the difference in phase between like beat frequencies passed thereby.

10. A position determining system comprising, a plurality of transmitters tuned to transmit at different frequencies, one pair of said transmitters being spaced apart a first distance, another pair of said transmitters being spaced apart a distance considerably greater than the said first distance, a mobile receiver unit and a stationary receiver unit each adapted to detect the beat frequencies between the emissions of the transmitters of each of the said transmitter pairs, means for indicating the difference in phase between the beat frequencies of the said one pair of transmitters as detected by the mobile and stationary receiver units, means for indicating the difference in phase between the beat frequencies of the said other pair of transmitters as detected by the mobile and stationary receiver units, the first distance being sufficiently limited so that the phase relationship of the beat frequencies of the one pair of transmitters provides a position without ambiguity over the possible range of movement of the mobile receiver, whereby the indicated phase relationship of the beat frequencies of the second pair of transmitters may provide a position without ambiguity.

CHARLES E. HASTINGS.

REFERENCES CITED

The following references are of record in the file of this patent:

UNITED STATES PATENTS

| Number | Name | Date |
| --- | --- | --- |
| 2,144,203 | Shanklin | Jan. 27, 1939 |
| 2,148,267 | Honore | Feb. 21, 1939 |
| 2,551,604 | Jacobsen | May 8, 1951 |